US008028258B1

(12) United States Patent
Ogami et al.

(10) Patent No.: US 8,028,258 B1
(45) Date of Patent: Sep. 27, 2011

(54) INTERACTIVE GRAPHICAL PIN ASSIGNMENT

(75) Inventors: Kenneth Y. Ogami, Bothell, WA (US); Doug Anderson, Edmonds, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 398 days.

(21) Appl. No.: 11/707,200

(22) Filed: Feb. 14, 2007

Related U.S. Application Data

(60) Provisional application No. 60/774,296, filed on Feb. 16, 2006.

(51) Int. Cl.
*G06F 17/50* (2006.01)

(52) U.S. Cl. ........ 716/110; 716/116; 716/117; 716/119; 716/121; 716/122

(58) Field of Classification Search ........... 716/110–122
See application file for complete search history.

(56) References Cited

U.S. PATENT DOCUMENTS

| 7,086,014 | B1 * | 8/2006 | Bartz et al. ...................... 716/1 |
| 7,100,139 | B1 * | 8/2006 | Anderson et al. ............... 716/11 |
| 7,299,444 | B1 * | 11/2007 | Tai et al. .......................... 716/16 |
| 7,331,022 | B1 * | 2/2008 | Pritchard et al. .............. 716/126 |
| 7,653,884 | B2 * | 1/2010 | Furnish et al. .................... 716/2 |
| 2005/0278665 | A1 * | 12/2005 | Gentry et al. ..................... 716/4 |
| 2009/0178017 | A1 * | 7/2009 | Gupta et al. .................... 716/15 |

* cited by examiner

*Primary Examiner* — Paul Dinh

(57) ABSTRACT

A design tool provides interactive graphical pin assignment. In one embodiment, the design tool identifies layout restrictions of a configurable processing device that includes a plurality of pins. The design tool further provides an interactive visual representation of a pin assignment that accommodates the layout restrictions and a user input.

16 Claims, 9 Drawing Sheets

INTERACTIVE GRAPHICAL PIN ASSIGNMENT

CROSS-REFERENCE TO RELATED APPLICATIONS

This application claims the benefit of U.S. Provisional Application No. 60/774,296, filed Feb. 16, 2006, and incorporated herein by reference in its entirety.

TECHNICAL FIELD

Embodiments of the invention relate generally to embedded application development and more specifically, but not exclusively, to interactive pin assignment using a graphical user interface during development of an embedded application.

BACKGROUND

Shortened time to design and user error reduction are essential to the success of application development environments. Current application development environments are geared towards system engineers. In a conventional application development environment, a user generally would need to manually edit the pin connections to a driver, which is typically associated with an input, an output, or an interface signal. This process involves identifying modules associated with the driver, and manually modifying resource configurations to accomplish the desired pin connection. In the process of changing the resource configurations, the user needs to consider the usage of those resources by other pin connections to other drivers in the system. The user also needs to consider how to modify resource configurations and maintain the desired pin connections to other drivers.

As noted above, such a process involves extensive manual operations. To perform the necessary manual operations, the user needs to fully understand the interconnection topology and the interconnection limitations. Such a process may be too low level for system designers. Moreover, once a pin connection is manually modified, it may be difficult to return to a previous pin configuration. It may also be difficult to save the pin configuration if drivers are added, or deleted, from a design project.

BRIEF DESCRIPTION OF THE DRAWINGS

The present invention is illustrated by way of example and not limitation in the figures of the accompanying drawings, in which.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

An interactive graphical pin assignment is described. The interactive graphical pin assignment allows a user to develop an embedded application that can be placed in a processing device and specify the assignment of particular signals to the particular pins of the processing device. In one embodiment, the particular signals assignable by the user are associated with the drivers of the embedded application. A graphical user interface (GUI) presents a pin assignment and allows the user to modify the current pin assignment. The GUI gives indications as to which pins are possible and of those possible pins, which cannot currently be assigned due to conflicting resources with other pin assignments. Pin assignments may also be generated automatically based on a prioritization dependent on the driver type. Once the pin assignment is completed to the satisfaction of the user, the pin routing information is automatically incorporated into the final embedded application. The pin configuration is saved as a separate metadata that is maintained in parallel with other user changes.

Figure 1:
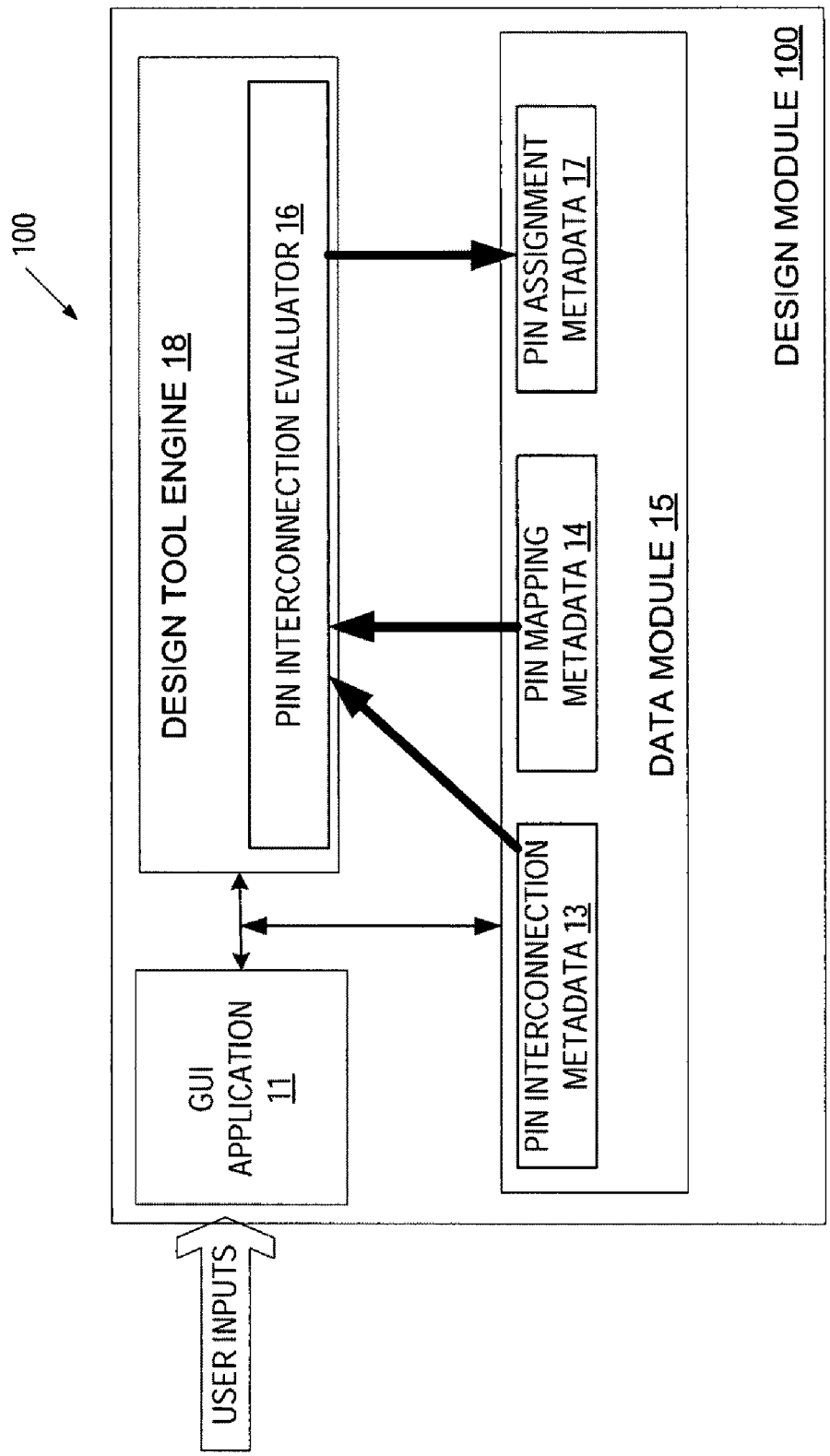
FIG. 1 is a block diagram of one embodiment of a design module that facilitates interactive graphical pin assignment.

FIG. 1 illustrates one embodiment of a design module 100 that performs interactive graphical pin assignment. In this embodiment, a GUI application 11 renders an interactive pin assignment GUI that allows a user to perform or modify a pin assignment for a processing device. A processing device herein refers to a configurable chip that includes memory and functional blocks, which, when configured according to a system design, form an embedded system. More details on the processing device will be described later with reference to FIG. 9. A user may select a processing device from a catalog of chips (also referred to as "parts") offered by design module 100. The processing device includes a plurality of pins, at least some of which are to be connected to the signals associated with the user-selected drivers.

Design module 100 includes a design tool engine 18 that configures the processing device into an embedded system according to the user's system-level specification. Design tool engine 18 includes a pin interconnection evaluator 16 that evaluates the pin configuration for potential assignment to drivers, identifies layout restrictions of the processing device, and performs the pin assignment based on user inputs from GUI application 11, as well as pin interconnection metadata 13 and pin mapping metadata 14 from a data module 15. Pin interconnection evaluator 16 generates the result of pin assignment, and stores it in data module 15 in the form of pin assignment metadata 17. Pin assignment metadata 17 contains sufficient information for design tool engine 18 to reproduce the pin assignment.

Figure 2:
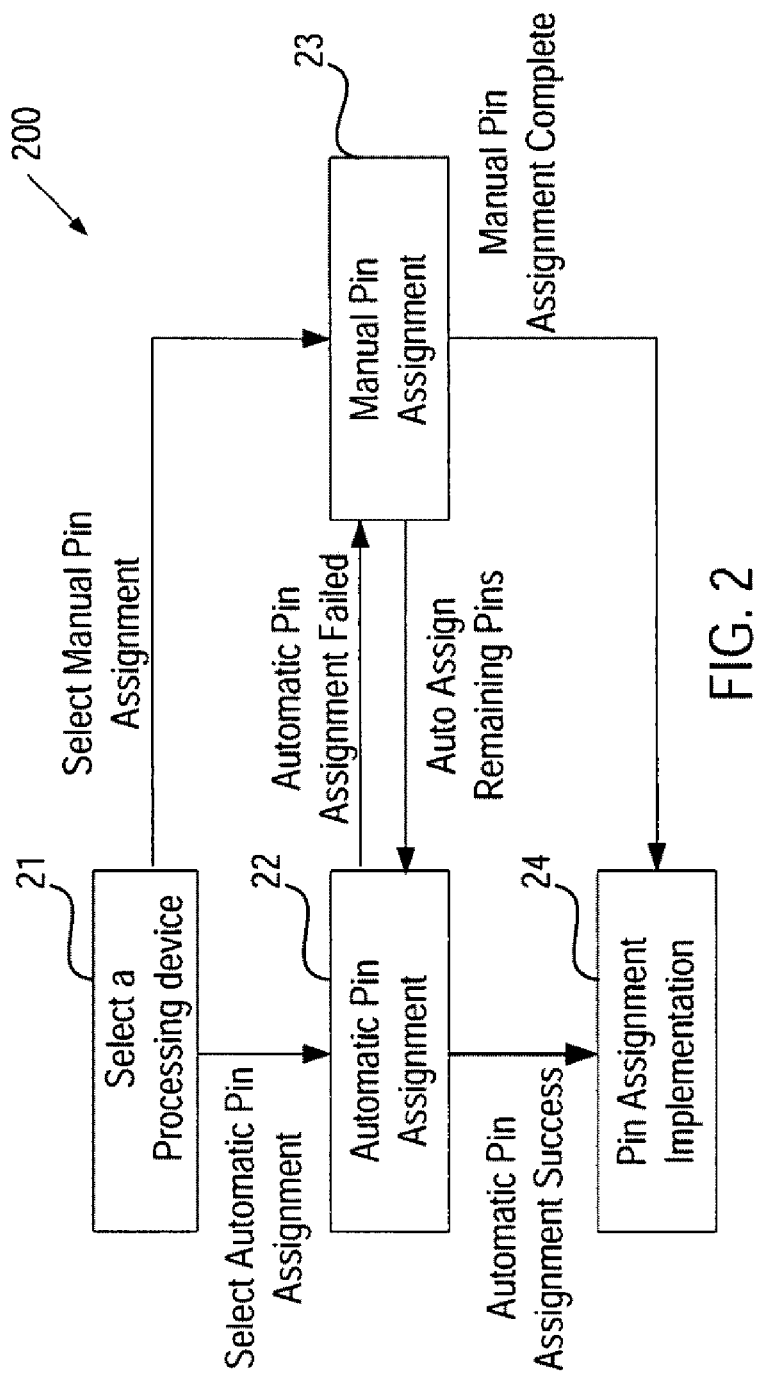
FIG. 2 is a flow diagram of one embodiment of a method for facilitating the interactive graphical pin assignment.

FIG. 2 illustrates one embodiment of a method 200 performed by processing logic of design module 100 of FIG. 1 to facilitate interactive graphical pin assignment. Processing logic may comprise hardware (e.g., circuitry, dedicated logic, programmable logic, microcode, etc.), software (such as run on a general purpose computer system or a dedicated machine), or a combination of both. The interactions with the user are controlled by GUI application 11.

At block 21, a user selects a processing device to implement a system design. Pin assignment may be performed after the user selects the processing device but before a build phase during which the user's system design is associated with the selected processing device. In one embodiment, design module 100 offers an automatic pin assignment mode and a manual pin assignment mode. At block 22, the user may elect to enter an automatic pin assignment mode, which automatically assigns all pins using a pin prioritization table. The pin prioritization table may restrict assignable pins to a subset of the total pins available on the processing device, and may determine the order in which the pins should be assigned. In one embodiment, the automatic pin assignment mode may be invoked by activating an indicator in a BuildManager dialog displayed prior to the pin assignment GUI.

At block 23, the user may alternatively elect to enter a manual pin assignment mode to manually assign the pins using the pin assignment GUI.

At block 24, if the automatic pin assignment is selected and the automatic assignment is successful, the result of the automatic pin assignment is implemented into the design and the pin assignment GUI is not presented. However, if the user does not elect automatic pin assignment, or if the automatic assignment fails, then pin assignment GUI is presented to allow manual pin assignment (block 23). Automatic pin assignment may fail if all pins designated by the pin prioritization table are in conflict with some current driver pin assignment.

Manual pin assignment may fail if any of the resources needed to accomplish the pin assignment are in conflict with some currently assigned driver pin (block 23). If the manual pin assignment fails, the user may re-assign the failed pins or may have the remaining pins automatically assigned (block 22). The user may stop manual pin assignment at any point to elect automatic pin assignment.

An example of a user interface (UI) will now be described with reference to FIG. 3. The exemplary UI may be generated in a variety of ways, such as using HyperText Markup Language (HTML), JavaScript, or the like. It will be understood that embodiments of the present invention are not limited to the UIs discussed herein.

Figure 3:
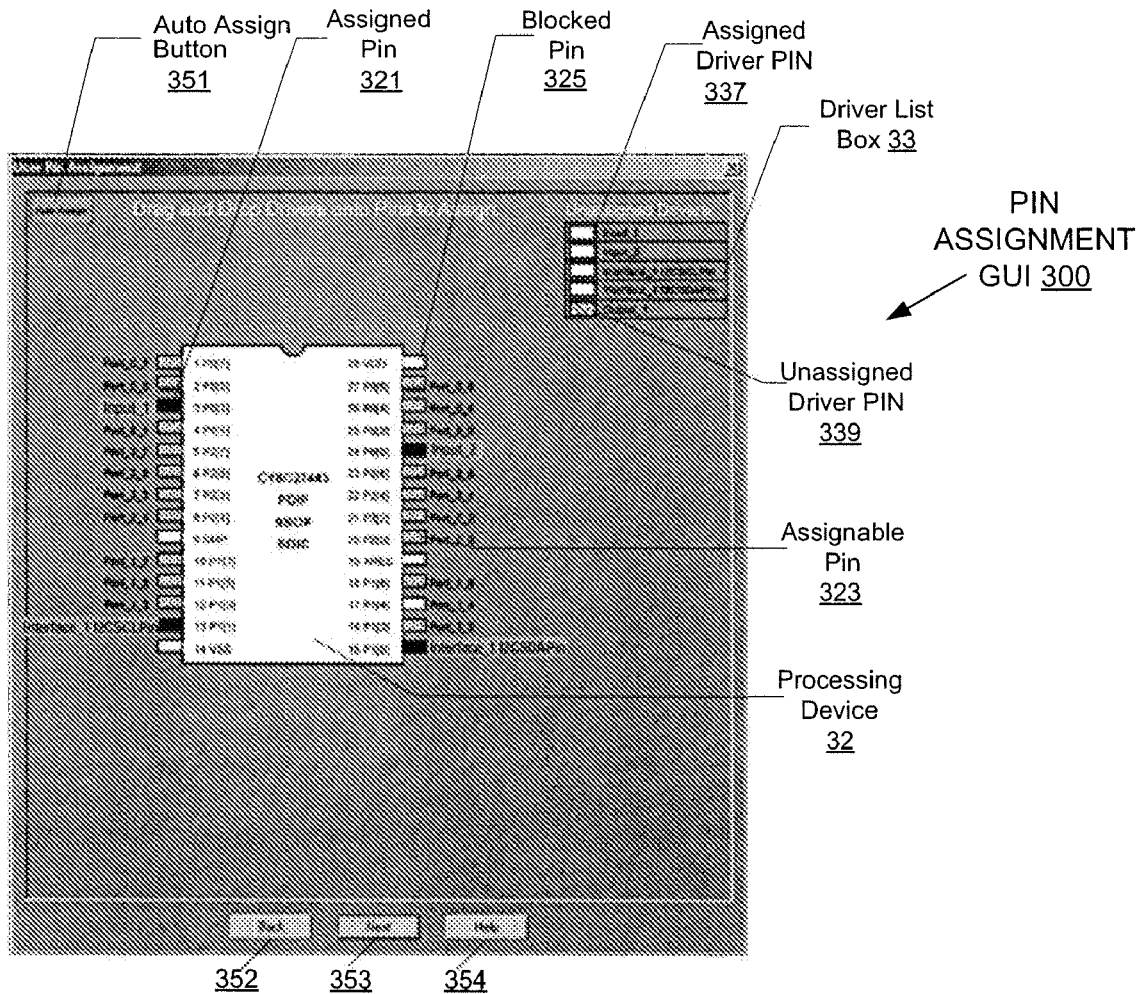
FIG. 3 illustrates an embodiment of a pin assignment graphical user interface.

FIG. 3 illustrates one embodiment of a pin assignment GUI 300, which graphically presents an interactive visual representation of a pin assignment. Pin assignment GUI 300 reflects the ability or inability for the user to assign drivers to various pins. Pin assignment GUI 300 also reflects the current pin configuration and guides the user in the assignment of the pins. In one embodiment, pin assignment GUI 300 may allow the user to assign, un-assign, and move any pin assignment using a drag-and-drop mechanism. Alternatively, other user interface means may be used.

In the embodiment as shown, pin assignment GUI 300 presents a processing device 32 including a plurality of pins. Each pin is associated with a UI element, represented by a rectangular object, to indicate the assignment status of the pin. The UI element for each pin assignment status may include, but is not limited to, an assigned pin 321, an assignable pin 323, and a blocked pin 325. One or more of the pin assignment status may be indicated by distinct visual indicia, e.g., colors, highlights, patterns, or other suitable indicators.

Pin assignment GUI 300 may also include a driver list box 33 showing the driver pins to be assigned to the processing device pins. The term "driver pin" herein refers to an I/O or an interface signal controlled by a driver. Each driver may be associated with one or more driver pins. The driver pins associated with the same driver may be assigned as a group or independently. Each driver pin may be associated with a UI element that indicates the assignment status of the driver pin. The UI element for each driver assignment status may include, but is not limited to, an assigned driver pin 337, an unassigned driver pin 339. One or more of the driver pin assignment status may be indicated by distinct visual indicia, e.g., colors, highlights, patterns, or other suitable indicators.

Any unassigned driver pin 339 can be dragged and dropped into any of assignable pins 323. When a user selects an unassigned driver pin 339, all of assignable pins 323 may be highlighted. Thus, a user may clearly see to which pins unassigned driver pin 339 can be placed. Pin assignment GUI 300 may also show, among assigned pins 321, which ones are possible candidates for placing unassigned driver pin 339. An alternate highlight may indicate that assignment to a processing device pin is possible, but the assignment is blocked by one or more of the currently assigned pins 321. If the user wishes to assign a driver pin to any of assigned pins 321, the user may force that driver pin to assign and displace the one or more driver pins that were blocking the assignment. Displaced driver pins are returned to an unassigned state. In the case of driver pins being assigned as a group, the entire group is blocked if the assignment of at least one of the driver pins within the group is blocked.

After a driver pin is placed into a processing device pin, the user may drag the placed driver pin from processing device 32 back to driver list box 33 to un-assign the pin. The user may also directly move a placed driver pin from an assigned pin 321 to any other assignable pin 323 to change the pin assignment for the driver pin.

Pin assignment GUI 300 may also allow the user to "lock" and "unlock" pins. A pin may be locked to prevent automatic assignment, and may be unlocked to allow automatic assignment. Manual assignment of a pin sets a manual assignment attribute associated with the pin so that the pin assignment persists across subsequent pin reassignments in the design project. Thus, manual assignment of a pin essentially locks the pin. Unlocking the pin can reset the manual assignment attribute. Pin assignment GUI 300 may also enable pin locking by manual placement or a right-mouse-click on a context sensitive menu, and enable unlocking by a right-mouse-click on the context sensitive menu. Other locking and unlocking mechanisms may also be provided.

Pin assignment GUI 300 may include an Auto Assign button 351 to elect automatic assignment, a Back button 352 to go back to a previous display (e.g., the BuildManager dialog), a Next button 353 to accept the current pin assignment, and a Help button 354 to obtain explanations for the GUI operations. Other selectors or indicators may also be provided.

Once the pins are assigned, the pin assignment can be maintained through editing cycles. Thus, the pin-out configurations may be persistent over multiple build phases as long as there is no change to the base project that defines pin interconnections.

Figure 4:
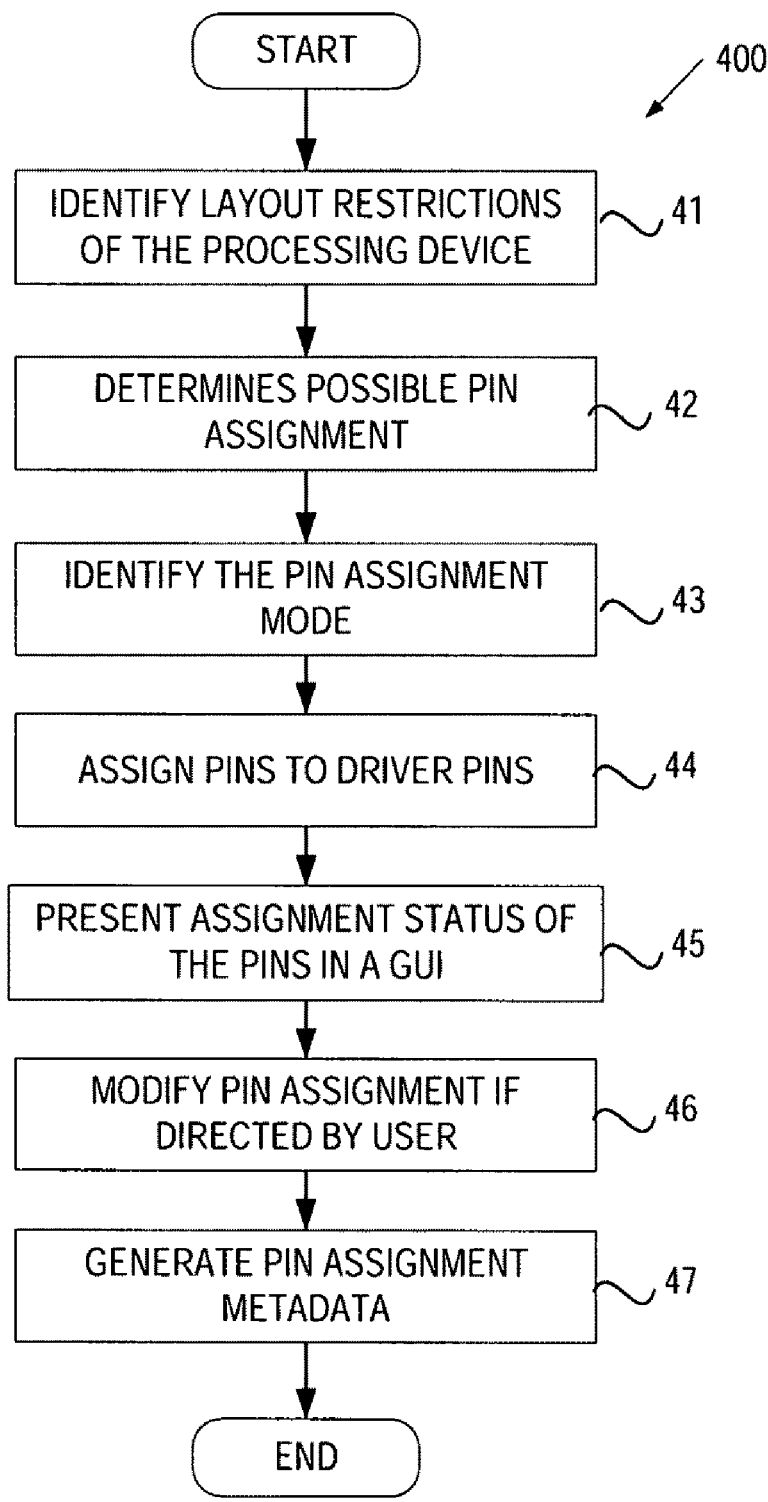
FIG. 4 is a flow diagram of one embodiment of operations performed by the design module of FIG. 1.

FIG. 4 illustrates an embodiment of a method 400 performed by processing logic of pin interconnection evaluator 16 of FIG. 1. Processing logic may comprise hardware (e.g., circuitry, dedicated logic, programmable logic, microcode, etc.), software (such as run on a general purpose computer system or a dedicated machine), or a combination of both.

At block 41, pin interconnection evaluator 16 identifies layout restrictions of the processing device based on pin interconnections metadata 13 and pin mapping metadata 14. Once the layout restrictions are identified, at block 42, pin interconnection evaluator 16 evaluates the possible pins that can be assigned to a driver, the assignment of which will not be in conflict with any other currently assigned drivers. At block 43, pin interconnection evaluator 16 identifies one of the pin assignment modes selected by the user. At block 44, pin interconnection evaluator 16 assigns the pins according to the pin assignment mode. Transitions between the automatic and the manual pin assignment modes have been described before in conjunction with FIG. 2.

At block 45, after pin interconnection evaluator 16 completes the assignment action for all of the driver pins, pin assignment GUI 300 presents the assignment status of the pins of the processing device. At block 46, the user may manually modify the current pin assignment by to obtain a different pin assignment. A pin can be un-assigned after it is assigned. If the user un-assigns a pin, pin interconnection evaluator 16 frees the resources associated with current pin assignment for the un-assigned pin.

At block 47, when the user accepts the current pin assignment, pin interconnection evaluator 16 generates pin assignment metadata 17 and stores the metadata in data module 15. Design module 100 may use pin assignment metadata 17 to configure the processing device.

The following descriptions provide more details of pin interconnection metadata 13 and pin mapping metadata 14 of FIG. 1, as well as the details of pin assignment evaluation using pin interconnection metadata 13 (including the pin prioritization tables) and pin mapping metadata 14.

Pin Interconnection Metadata 13. Pin interconnection metadata 13 describes the pin interconnection topology of the processing device. Pin interconnection metadata 13 includes the resource configuration needed to connect a driver to a resource in the processing device. The resource configurations include the name of each resource and the respective resource value needed to establish the pin connection.

Pin interconnection metadata 13 stores the result of pin interconnection calculations. In one embodiment, pin interconnection calculations may be accomplished using extensible stylesheet language transformation (XSLT) node translation technology, programmatically using C code in design tool engine 18, or with Java script. Alternative approaches to pin interconnection calculations may also be used. The pins may have multiple interconnection paths designated by type. The types include, but are not limited to, digital input, digital output, analog input, and analog output. The types are used by pin interconnection evaluator 16 in conjunction with pin mapping metadata 14 to determine the appropriate resources to form a pin connection to a driver.

In one embodiment, the pin interconnections are calculated based on patterns that exist across part families with consideration to the pattern unique to a part family. Each part family defines interconnections in terms of resources that are present across the part family and are relevant to pin connections. In one embodiment, at least one resource in each part family is designated as a connection point for the pin interconnections defined in a part-specific base project. More details about the base project will be provided below with reference to FIGS. 6 and 8. The part-specific base project defines the pin interconnections in terms of the resources (e.g., the pins) included in that specific part and a corresponding connection point in the part family base project. Ultimately, when a processing device (i.e., a part) is selected, the pin interconnections between the part family and part-specific base projects are combined through the connection points to form complete pin interconnections for the selected processing device.

In one embodiment, part-specific base projects include pin prioritization tables, which may be used for automatic pin assignment.

Pin Mapping Metadata 14. Pin mapping metadata 14 designates the resources needed by the user design and the rules to use during pin configuration evaluation. Pin mapping metadata 14 may be contained in channel metadata and associated with channel instances. More details about the channel will be provided below with reference to FIG. 6. Each channel instance designates a set of resources and mapping rules for design tool engine 18 to follow during pin configuration evaluation. Each resource is described by the name and the type of the resource, attributes to define the mapping rules, and operations associated with the pin interconnection. The attributes may include, but are not limited to, 1) pin source, which indicates that the resource is the primary objective of the pin connection, 2) shareable, which indicates that the resource can be shared among channels of a similar type, 3) assignable, which indicates that the resource can be reallocated to one of a similar type to accomplish pin interconnection, and 4) user module parameter name, which indicates that the resource name should be assigned to the named user module parameter to accomplish a pin interconnection.

In one embodiment, the resources between channel instances should not overlap in order to assure that initial pin assignments do not conflict between instances of same channel type. In one embodiment, a channel also designates a pin prioritization table in the base project to use for automatic pin assignment.

Pin Configuration Evaluation. Based on the user inputs, pin interconnection metadata 13, and pin mapping metadata 14, pin interconnection evaluator 16 performs a number of evaluation actions including, but not limited to, identifying assignable pins, identifying impediments to assignable pins due to the current resource usage, automatically assigning pins, manually assigning pins, and manually un-assigning pins. These actions are performed on the driver pins. The channel determines the number of driver pins, but the name associated with each driver pin is determined by the instance name associated with the driver. In the case of multiple driver pins being associated with a driver, those driver pins may be assigned as a group, or independently, as determined by pin mapping metadata 14 for the channel.

Pin interconnection evaluator 16 identifies resource assignment conflicts and evaluates the conflicts based on the resource attributes in pin mapping metadata 14. Pin interconnection evaluator 16 uses the pin source attribute to filter the total pin interconnection set to those relevant to the pin and the designated pin source. Pin interconnection evaluator 16 allows a shareable resource to be used by driver pins that share a common channel type. If all resources within a channel instance are not assignable, then pin interconnection evaluator 16 may consider a different channel instance for evaluation of different pin interconnections. If at least one resource is assignable, pin interconnection evaluator 16 may use the same channel instance when considering possible pin connections where the resource types match the types of the assignable resources.

Pin Configuration Implementation. Pin configuration implementation refers to the act of modifying the embedded application project to implement the pin interconnections specified. After user module placement, the pin assignment resources configuration is set in the embedded application project. If any of the resources has a user module parameter name specified, then the parameter for the appropriate user module is set to the resource name. In the case of a resource is assignable, the pin assignment resource has precedence over the channel instance resource of the same type.

An interactive graphical pin assignment is described. With such an interactive graphical pin assignment, the user does not need explicit knowledge about the pin interconnection topology to accomplish a desired pin configuration. The pin assignment also involves an automated conflict management process that considers all design operations, including changes to the driver configuration, which may be in conflict with an existing pin assignment. Pin assignment configurations may be saved so that configurations can easily be reverted to previous assignments.

In one embodiment, the interactive graphical pin assignment described herein may be used in a design tool for embedded applications, e.g., PSoC Express™ or PSoC Designer™, available from Cypress Semiconductor, Inc., with headquarters in San Jose, Calif. Alternatively, the interactive graphical pin assignment may be used in other design tools.

Figure 5:
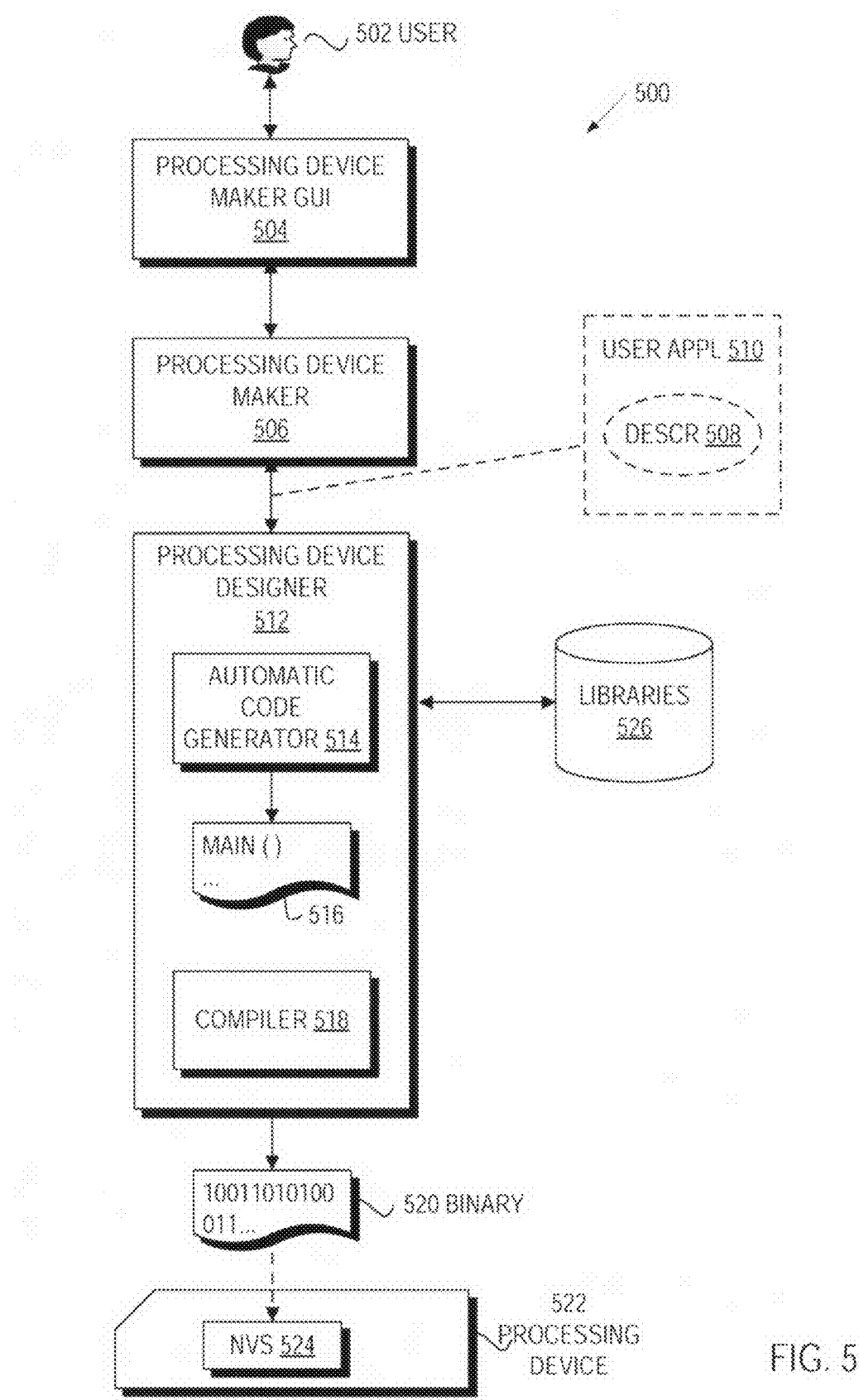
FIG. 5 is a block diagram of one embodiment of a system enabling automated code generation of processing device firmware.

FIG. 5 illustrates an exemplary system 500 in which embodiments of the present invention may operate. System 500 provides automated code generation of processing device firmware in accordance with one embodiment of the present invention.

System 500 includes a processing device maker GUI 504 that may be used by a user 502 to construct a user application 510 for implementation on a processing device 522. The processing device maker GUI 504 overlays a processing device maker 506. Pin assignment GUI 300 discussed above in conjunction with FIG. 3 may represent a pop-up window in processing devices maker GUI 504. In addition, design module 100 of FIG. 1 may be used as part of system 500 to generate processing device maker GUI 504 and facilitate its functionality during the design of user application 510.

User application 510 may be described in a user application description 508. In one embodiment, user application description 508 is a text file that describes user's application 510.

After user 502 completes the design of application 510, user 502 may perform a simulation of user application 510. The simulation capability enables hardware independence by verifying the transfer function behavior without requiring the user to compile and debug the firmware on the targeted processing device. Simulation also includes the ability to create complex input files to exhaustively test the transfer function behavior with arbitrarily large combinations of input values. The simulation logs the outputs based on the transfer function behavior so that the results may be analyzed by the user.

Next, user 502 may request via processing device maker GUI 504 that processing device code be automatically generated. User 502 does not have to perform any actual coding. In one embodiment, after user 502 selects the targeted processing device, user application description 508 is handed-off to a processing device designer 512 for the generation of processing device code. Processing device designer 512 may include an automatic code generator 514 that assembles the code for user's application 510 based on the user application description 508. Automatic code generator 514 generates processing device code 516 (e.g., high-level language code, such as C, low-level code, such as Assembly, or a combination thereof).

In one embodiment, automatic code generator 514 references libraries 526 that include code blocks that may be combined to form code 516. Automatic code generator 516 may use at least a portion of user application description 508 as a guide in gathering together various code blocks. Some of the code blocks may be selected based at least in part on targeted processing device 522.

A compiler 518 compiles code 516 to generate a binary 520, also known as a binary image or a Read-Only Memory (ROM) image. Binary 520 is loaded into a Non-Volatile Storage (NVS) 524 of the processing device 522. In one embodiment, NVS 524 includes Flash memory.

Embodiments of processing device 522 may include one or more general-purpose processing devices, such as a microprocessor or central processing unit, a network processor, a microcontroller, an embedded Programmable Logic Device (PLD), or the like. Alternatively, the processing device may include one or more special-purpose processing devices, such as a Digital Signal Processor (DSP), an Application Specific Integrated Circuit (ASIC), a Field Programmable Gate Array (FPGA), or the like. The processing device may also include any combination of a general-purpose processing device and a special-purpose processing device.

It will be appreciated that because code 516 is constructed from pre-built and pre-tested code libraries, time wasted on debugging, such as finding syntax errors, is eliminated. It will also be appreciated that user 502 has generated user application 510 without referencing a targeted processing device. Instead of choosing a processing device to implement a user application and then writing code for that processing device, embodiments of the present invention allow a user application to be created and then code automatically generated for a particular processing device. Moreover, a user may take a user application, make revisions to the user application, and quickly generate revised programming device code.

Figure 6:
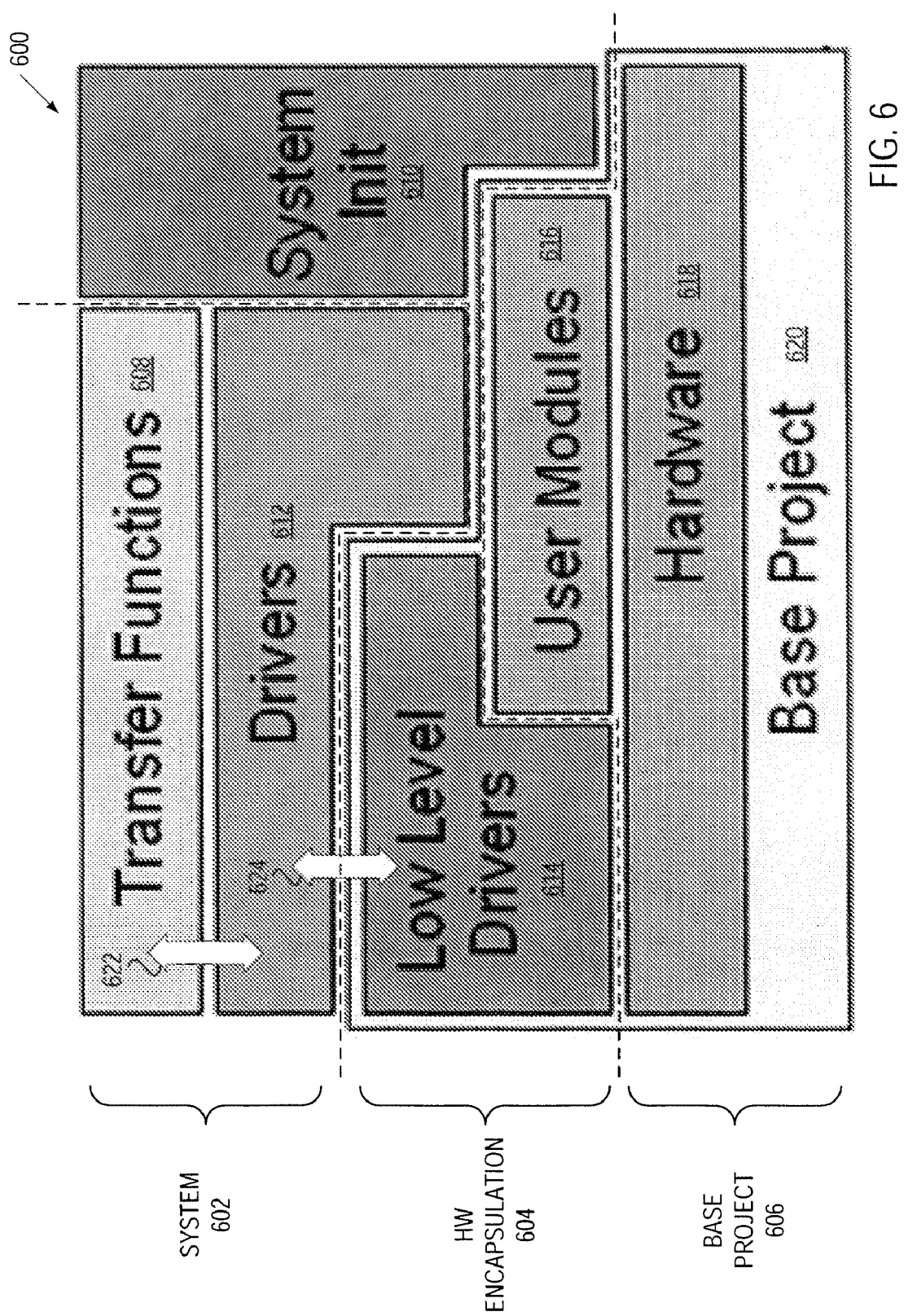
FIG. 6 illustrates a firmware stack in accordance with one embodiment of the present invention.

Referring to FIG. 6, a firmware stack 600 in accordance with one embodiment of the invention is shown. Firmware stack 600 shows a logical structure of at least a portion of the processing device code 516. Data module 15 of FIG. 1 may include at least of portion of firmware stack 600. As discussed below, a portion of the stack is abstracted away from specific hardware. Such hardware independency provides the automatic code generator a consistent architecture for stitching together various code blocks.

Firmware stack 600 includes a system layer 602, a hardware encapsulation layer 604, and a base project layer 606. As will be described further below, the functionality of the system layer 602 is independent of the targeted processing device. Also, interfaces, such as Application Program Interfaces (APIs), made between system layer 602 and the remaining layers of firmware stack 600 are standardized regardless of the targeted processing device. The term "standardized" refers to the hardware independence of the APIs. This abstraction away from specific hardware allows system layer 602 to function without regard to the particular hardware. The low layers of firmware stack 600 have "knowledge" of the specific hardware and take care of the implementation details for system layer 602.

Hardware encapsulation layer 604 and base project layer 606 are generated based at least in part on the targeted processing device. Hardware encapsulation layer 604 represents the underlying hardware to system layer 602. Base project layer 606 includes a set of standard functions associated with the targeted processing device hardware. Base project layer 606 may include functionality at the register level of the targeted processing device. Pin interconnection metadata 13 discussed above in conjunction with FIG. 1 may be part of base project layer 606.

System layer 602 may include transfer functions 608 and drivers 612. System layer 602 is targeted by an application level mapping function. Transfer functions 608 invoke the transfer functions defined by the user 602.

Drivers 612 are usually associated with a hardware component of the processing device. In one embodiment, drives 612 may include three types: input, output, or interface. An output driver may be used with a device that is controlled by the user application, such as a fan or heater. Input drivers may be used for sensors, such as temperature or voltage sensors. Interface drivers may be used for devices that allow access to system variables and status, such as an Inter-Integrated Circuit (I2C) or a Serial Peripheral Interface (SPI).

Transfer functions 608 and drivers 612 may communicate with each other using APIs 622. Embodiments of an API include DriverName-Instantiate to initialize a device, DriverName_GetValue to return a value from an input device, and DriverName_SetValue to set an output of an output device to a specific value. Such APIs are defined such that the may be invoked regardless of the particular hardware.

Drivers 612 communicate with hardware encapsulation layer 604 using channels 624. Channels 624 are hardware independent. A channel may be further defined by a channel type, such as an input voltage channel, an output voltage channel, or the like. In one embodiment, channels 624 are implemented as APIs. Pin mapping metadata 14 discussed above in conjunction with FIG. 1 may be part of channels 624.

Hardware encapsulation layer 604 may include low level drivers 614 and system initialization 610. Low level drivers 614 provide the implementation of channels 624. In one embodiment, all drivers 612 use one or more channels 624 to communicate with low level drivers 614. In one embodiment, a channel may have associated parameters assigned by a low level driver, and the associated driver must conform to those parameters.

In one embodiment, the base project layer 606 includes User Modules (UMs) 616 and processing device hardware 618. User modules 616 are used with block arrays in processing device hardware 618 to form hardware components, such as an Analog-Digital Converter (ADC).

FIG. 6 also shows low level drivers 614, user modules 616, and Hardware 618 grouped into a Base Project 620.

Figure 7:
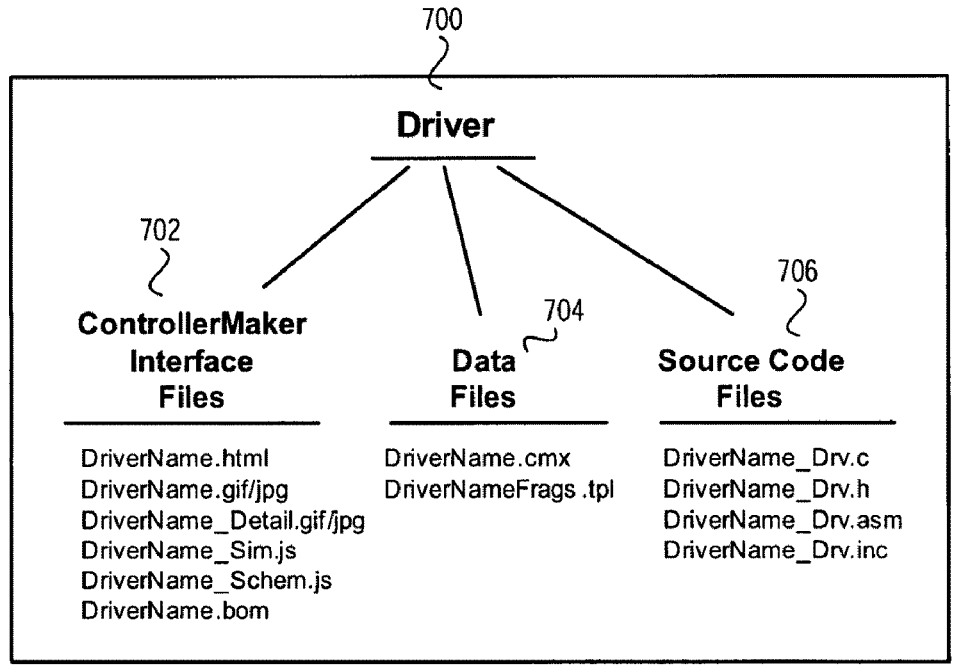
FIG. 7 illustrates a driver in accordance with one embodiment of the present invention.

Turning to FIG. 7, an embodiment of driver 700 is shown. In one embodiment, driver 700 includes several components for device selection and code generation. These components may be grouped into ControllerMaker Interface files 702, Data files 704, and Source Code files 706. Interface files 702 may include files to generate the visual interface in processing device maker GUI 504. Data files 704 are used for driver type selection, resource allocation, user parameter selection, and code generation. Data files 704 may include a driver name file that includes information about channel type, resource requirements, association with image files, and user selectable parameters. In one particular embodiment, the driver name file may be a DriverName.cmx file. The .cmx file extension indicates that the file can be used by a CMX engine, which is a proprietary design tool engine from Cypress Semiconductor, Inc. It is understood that other design tool engines and file formats may also be used. Source code files 706 include the driver firmware. Driver 700 may be written in C, Assembly, or a combination thereof.

Figure 8:
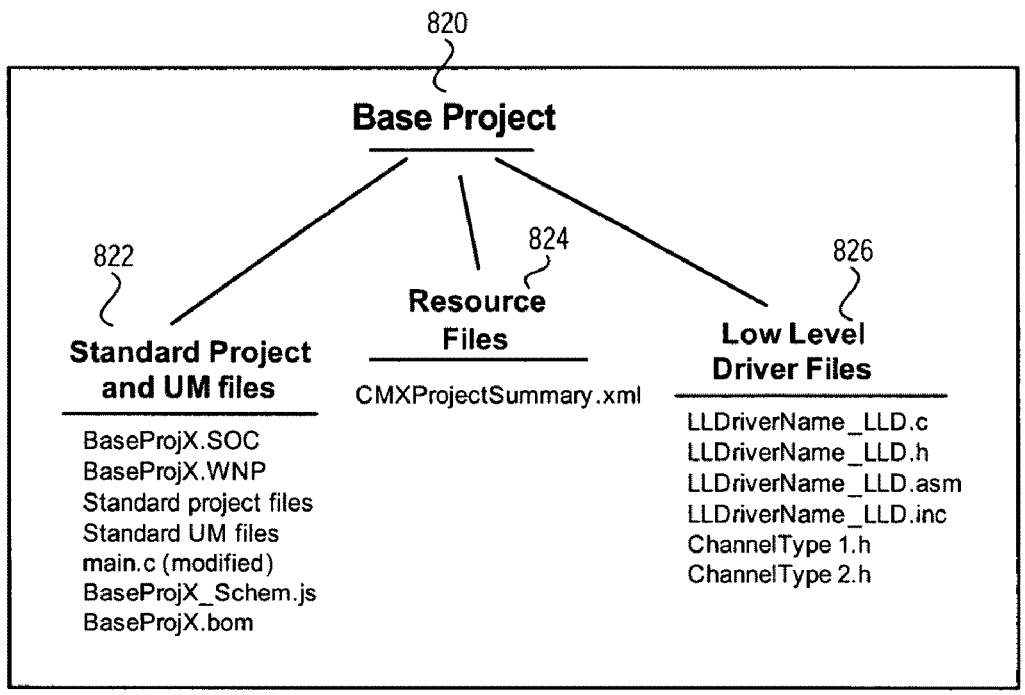
FIG. 8 illustrates a base project in accordance with one embodiment of the present invention.

Turning to FIG. 8, an embodiment of a base project 820 is shown. In one embodiment, base project 820 is built around the targeted processing device. Automatic code generator 514 refers to user application description 508 and adds the appropriate code for the drivers and transfer functions. The standardized calls to and from the drivers provide a consistent architecture for reliably connecting base project 820 to drivers.

Base project 820 may include any system design project using any of the processing device family of parts that support one or more driver channel types. In one embodiment, if a base project supports a given channel type, it must support it fully. The channel may support an external interface to the input or output signal as well as low level firmware to support the signal acquisition and signal conditioning required for reliable signal measurement. Processing device designer 512 adds drivers, such as driver 700, to a base project to support the input/output devices selected by user 502 in user application 510. A project summary file is included in a base project to define what channel types are supported and how many channels are available.

Base project 820 may include standard project and UM files 822, resource files 824, and low level driver files 826. Standard project and UM files 822 may include files that describe the specific user modules employed in the design project and their specific placement. The UM's and their placement determine the mapping of the channels to the external pins. With the UM configuration file, specific UM API files are included in so much as they are needed to control specific interrupt behavior required for successful signal acquisition and conditioning. By themselves these files create an empty project.

Low level driver files 826 provide the implementation of the channels supported by a given base project. A variety of ways can be used to implement a given channel type. For example, a volts channel can be supported by a wide range of ADCs, multiplexers, and ADC resolutions, as long as the API for the specific channel is fully supported. Some base projects may offer more resolution than others for certain channel types. These differences may be specified in a project summary file, e.g., a CMXProjectSummary.xml file. The CMX file prefix indicates that the file can be used by a CMX engine, which is one embodiment of design tool engine 18 of FIG. 1. It is understood that other design tool engines and file formats may also be used.

Resource files may include the project summary file, which may be an eXtensible Markup Language (XML) file contains metadata that communicate a list of resources provided by the base project to design tool engine 18. The XML file indicates the types and count of each of the resource channels and interfaces supported. It also determines the channel assignment order and prioritization, in the case of channels competing for similar resources. It may also provide specifications of each of the channel types, where applicable.

Figure 9:
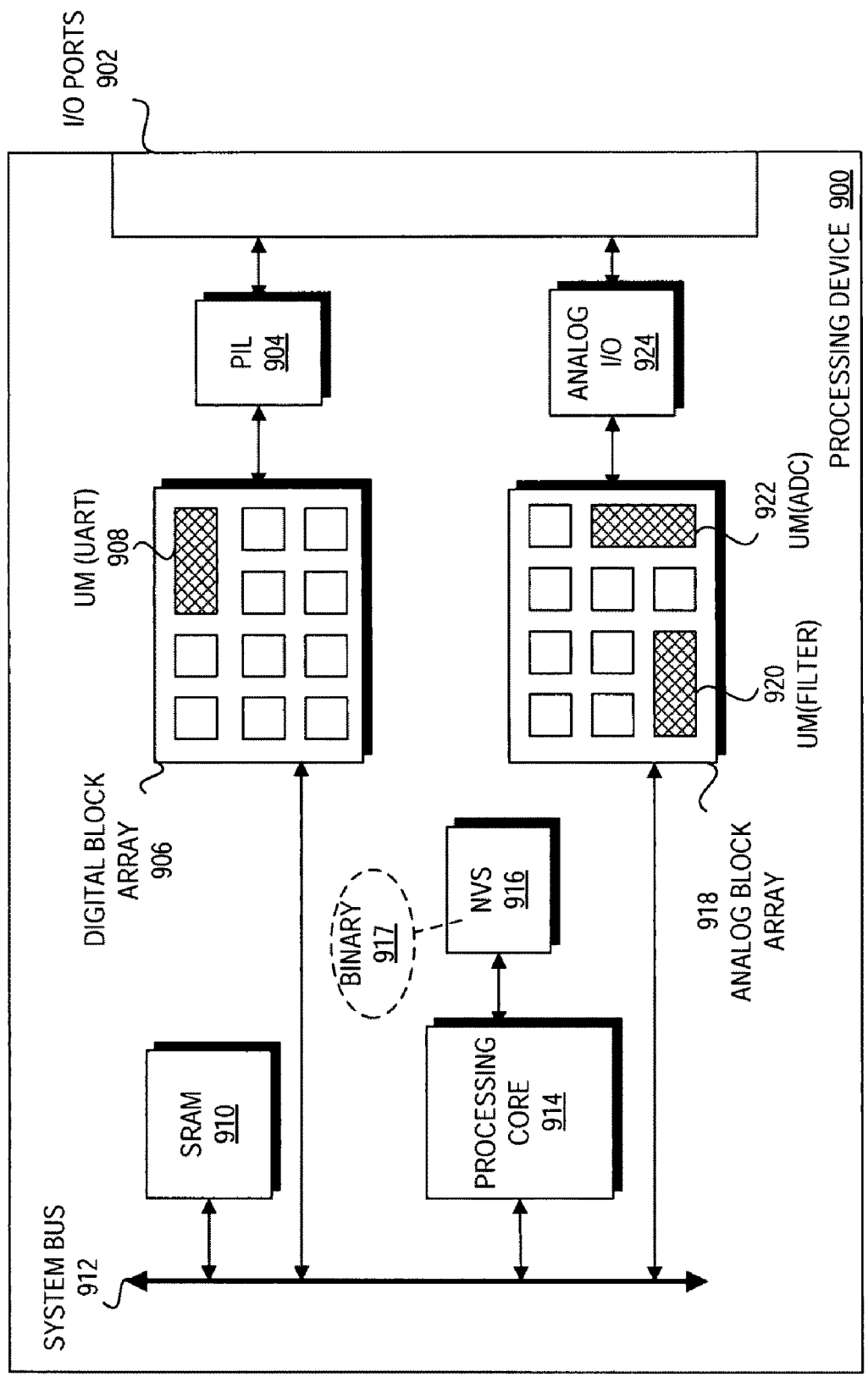
FIG. 9 is a block diagram of one embodiment of a processing device.

Turning to FIG. 9, an embodiment of a processing device 900 is shown. Processing device 900 includes a microcontroller. Processing device 900 includes Input/Output (I/O) ports 902. In one embodiment, I/O ports 902 are programmable. I/O ports 902 are coupled to a Programmable Interconnect and Logic (PIL) 904 which is coupled to a digital block array 906. In FIG. 9, digital block array 906 includes a UM 908 that has been configured as a Universal Asynchronous Receive/Transmitter (UART). Digital block array 906 is coupled to a system bus 912.

A Static Random Access Memory (SRAM) 910 and a processing core 914 are also coupled to system bus 912. Processing core 914 is coupled to NVS 916 which has stored a binary 917. In one embodiment, binary 917 includes instructions generated as described herein. In another embodiment, binary 917 may include instructions executable by processing core 914 as well as instructions for configuring block arrays 916 and 918.

Analog block array 918 is coupled to system bus 912. In the embodiment of FIG. 9, analog block array 918 includes a UM 920 configured as a filter and a UM 922 configured as an ADC. Analog block array 918 is also coupled to an analog I/O unit 924 which is coupled to I/O ports 902. Processing device 900 may also include other components, not shown for clarity, including a clock generator, an interrupt controller, an I2C, or the like.

Figure 10:
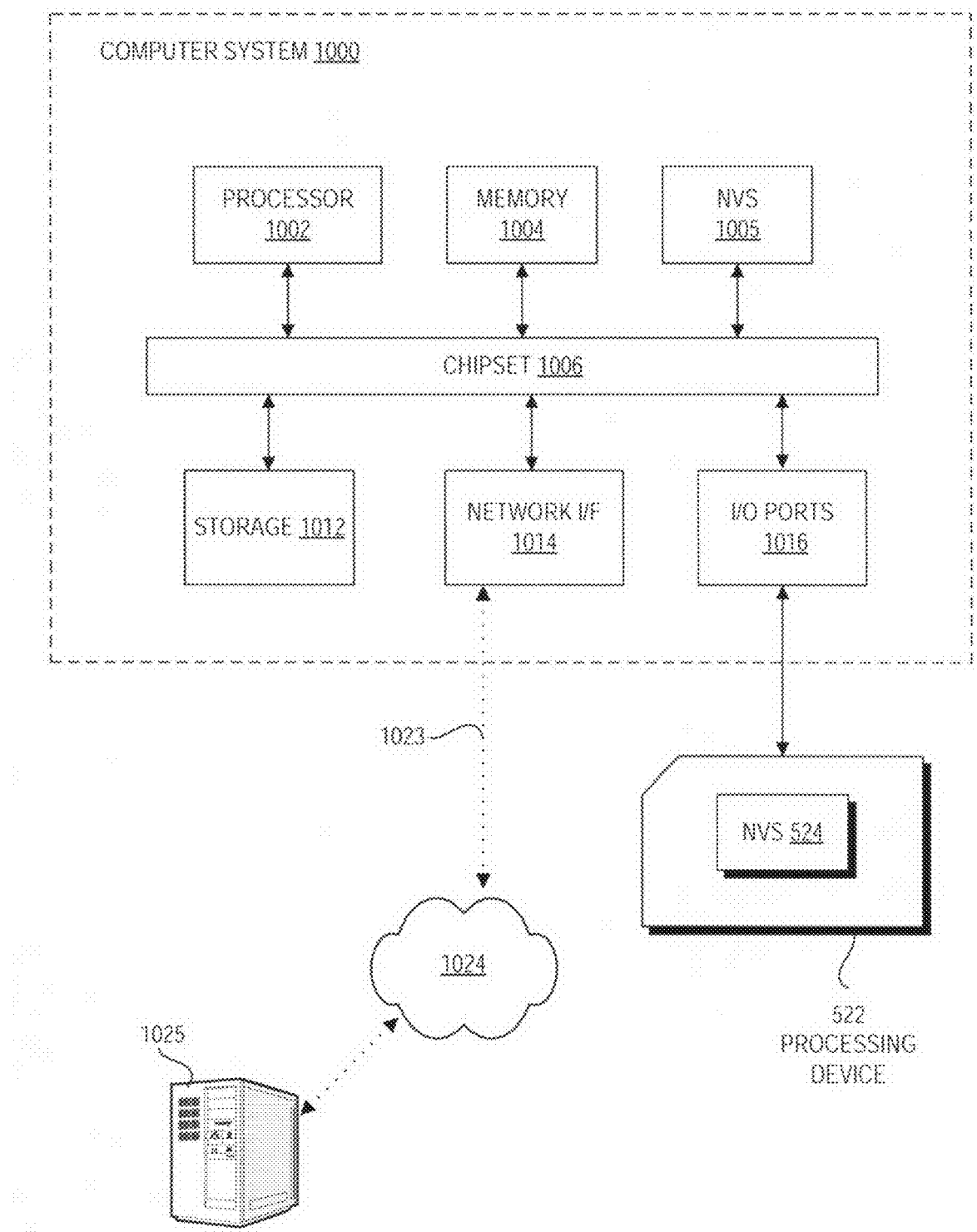
FIG. 10 is a block diagram of one embodiment of a computer system.

FIG. 10 illustrates an exemplary computer system 1000 on which embodiments of the present invention may be implemented. Computer system 1000 includes a processor 1002 and a memory 1004 coupled to a chipset 1006. Storage 1012, Non-Volatile Storage (NVS) 1005, network interface (I/F) 1014, and Input/Output (I/O) ports 1018 may also be coupled to chipset 1006. Embodiments of computer system 1000 include, but are not limited to, a desktop computer, a notebook computer, a server, a personal digital assistant, a network workstation, or the like. In one embodiment, processor 1002 executes instructions stored in memory 1004.

Memory 1004 may include, but is not limited to, Dynamic Random Access Memory (DRAM), Static Random Access Memory (SRAM), Synchronized Dynamic Random Access Memory (SDRAM), or the like.

Chipset 1006 may include a memory controller and an input/output controller. Chipset 1006 may also include system clock support, power management support, audio support, graphics support, or the like. In one embodiment, chipset 1006 is coupled to a board that includes sockets for processor 1002 and memory 1004.

Components of computer system 1000 may be connected by various interconnects. Such interconnects may include a Peripheral Component Interconnect (PCI), a System Management bus (SMBUS), a Low Pin Count (LPC) bus, a Serial Peripheral Interface (SPI) bus, an Accelerated Graphics Port (AGP) interface, or the like.

I/O ports 1016 may include ports for a keyboard, a mouse, a display, a printer, a scanner, or the like. Embodiments of I/O ports 1016 include a Universal Serial Bus port, a Firewire port, a Video Graphics Array (VGA) port, a Personal System/2 (PS/2) port, or the like.

Processing device 522 may be coupled to computer system 1000 via I/O ports 1016. Computer system 1000 may have stored computer-readable instructions, in accordance with embodiments described herein, to allow a user to design application 510 using UIs described herein and automatically generate processing device code for processing device 522 using computer system 1000. This code may be compiled into a binary and loaded into NVS 524.

Computer system 1000 may interface to external systems through network interface 1014. Network interface 1014 may include, but is not limited to, a modem, a Network Interface Card (NIC), or other interfaces for coupling a computer system to other computer systems. A carrier wave signal 1023 may be received and transmitted by network interface 1014. In the embodiment illustrated in FIG. 10, carrier wave signal 1023 is used to interface computer system 1000 with a network 1024, such as a Local Area Network (LAN), a Wide Area Network (WAN), the Internet, or any combination thereof. In one embodiment, network 1024 is further coupled to a computer system 1025 such that computer system 1000 and computer system 1025 may communicate over network 1024.

Computer system 1000 also includes non-volatile storage 1005 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like. Storage 1012 includes, but is not limited to, a magnetic disk drive, a magnetic tape drive, an optical disk drive, or the like. It is appreciated that instructions executable by processor 1002 may reside in storage 1012, memory 1004, non-volatile storage 1005, or may be transmitted or received via network interface 1014.

For the purposes of the specification, a machine-readable medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-readable medium includes, but is not limited to, recordable/non-recordable media (e.g., Read-Only Memory (ROM), Random Access Memory (RAM), magnetic disk storage media, optical storage media, a flash memory device, etc.).

Various operations of embodiments of the present invention are described herein. These operations may be implemented by a machine using a processor, an Application Specific Integrated Circuit (ASIC), a Field Programmable Gate Array (FPGA), or the like. In one embodiment, one or more of the operations described may constitute instructions stored on a machine-readable medium, that when executed by a machine will cause the machine to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A computer implemented method, comprising:
   identifying layout restrictions of a configurable processing device that includes a plurality of pins;
   providing, by a computer system implementing a design module, an interactive visual representation of a pin assignment that accommodates the layout restrictions and a user input, wherein the interactive visual representation indicates a pin of the processing device that can be assigned a signal without resource assignment conflicts, wherein the resource assignment conflicts are evaluated based on resource attributes that define mapping rules for the plurality of pins; and
   providing an automatic pin assignment mode and a manual pin assignment mode that are user-selectable through a graphical user interface, the graphical user interface:
   presenting a list of driver pins and the pins of the processing device;
   providing a user interface element associated with each of the driver pins; and allowing a user to bi-directionally move the user interface elements between the associated driver pins and the pins of the processing device to indicate a change to the pin assignment.

2. The method of claim 1, further comprising:
performing the pin assignment responsive to user-selection of one of the pin assignment modes.

3. The method of claim 1, further comprising:
providing distinct visual indicia to one or more of the following pin groups of the processing device:
assignable pins, assigned pins, and blocked pins.

4. The method of claim 3, further comprising:
highlighting the distinct visual indicia for the assignable pins when an unassigned driver pin is selected.

5. The method of claim 1, further comprising:
providing a drag-and-drop mechanism in the graphical user interface to allow a user to manually assign at least one of the pins of the processing device.

6. The method of claim 1, further comprising:
allowing a user to lock at least one of the pins of the processing device to prevent automatic assignment.

7. A design tool, comprising:
a pin interconnection evaluator to identify layout restrictions of a configurable processing device that includes a plurality of pins; and
a graphical user interface (GUI) application coupled to the pin interconnection evaluator, the GUI application configured to provide an interactive visual representation of a pin assignment to accommodate the layout restrictions and a user input, wherein the interactive visual representation indicates a pin of the processing device that can be assigned a signal without resource assignment conflicts, wherein the resource assignment conflicts are evaluated based on resource attributes that define mapping rules for the plurality of pins, the GUI application further configured to provide a pin assignment mode indicator for a user to select one of an automatic pin assignment mode and a manual pin assignment mode provided by the design tool; wherein the GUI application includes:
a list of drivers pins;
the pins of the processing device;
a user interface element associated with each of the driver pins; and
a drag-and-drop mechanism to allow a user to bi-directionally move the user interface elements between the associated driver pins and the pins of the processing device as an indication of a change to the pin assignment.

8. The design tool of claim 7, wherein the GUI includes:
distinct visual indicia for one or more of the following pin groups of the processing device:
assignable pins, assigned pins, and blocked pins.

9. The design tool of claim 7, further comprising:
a data module coupled to the pin interconnection evaluator, the data module configured to include metadata that describes the layout restrictions.

10. The design tool of claim 9, wherein the metadata comprises a pin prioritization table to allow prioritization assignment of the pins in the automatic pin assignment mode.

11. An article of manufacture comprising:
a non-transitory machine-readable medium including a plurality of instructions which when executed perform a method comprising:
identifying layout restrictions of a configurable processing device that includes a plurality of pins;
providing an interactive visual representation of a pin assignment that accommodates the layout restrictions and a user input, wherein the interactive visual representation indicates a pin of the processing device that can be assigned a signal without resource assignment conflicts, wherein the resource assignment conflicts are evaluated based on resource attributes that define mapping rules for the plurality of pins; and
providing user-selection of an automatic pin assignment mode and a manual pin assignment mode, through a graphical user interface, the graphical user interface:
presenting a list of driver pins and the pins of the processing device;
providing a user interface element associated with each of the driver pins; and
allowing a user to bi-directionally move the user interface elements between the associated driver pins and the pins of the processing device to indicate a change of the pin assignment.

12. The method of claim 11, further comprising:
performing the pin assignment responsive to user-selection of one of the pin assignment modes.

13. The article of manufacture of claim 11, wherein the method further comprises:
providing distinct visual indicia to one of more of the following pin groups of the processing device:
assignable pins, assigned pins, and blocked pins.

14. The article of manufacture of claim 13, wherein the method further comprises:
highlighting the distinct visual indicia for the assignable pins when an unassigned driver pin is selected.

15. The article of manufacture of claim 11, wherein the method further comprises:
providing a drag-and-drop mechanism in graphical user interface to allow a user to manually assign at least one of the pins of the processing device.

16. The article of manufacture of claim 11, wherein the method further comprises:
allowing a user to lock at least one of the pins of the processing device to prevent automatic assignment.

* * * * *